United States Patent [19]

Jackson

[11] 4,007,642
[45] Feb. 15, 1977

[54] SYSTEM AND METHOD FOR IDENTIFYING ANGULAR LOCATION AND AMOUNT OF WHEEL BALANCING WEIGHTS

[75] Inventor: Bernie F. Jackson, Los Gatos, Calif.
[73] Assignee: Nortron Corporation, Mountain View, Calif.
[22] Filed: May 14, 1975
[21] Appl. No.: 577,457
[52] U.S. Cl. .............................................. 73/462
[51] Int. Cl.² .................................... G01M 1/22
[58] Field of Search ............................ 73/66, 462
[56] References Cited
UNITED STATES PATENTS

| 2,074,840 | 3/1937 | Greentree | 73/462 X |
| 2,131,602 | 9/1938 | Thearle | 73/462 |
| 2,891,241 | 6/1959 | Fibikar | 73/462 X |
| 3,478,602 | 11/1969 | Tatum | 73/462 |
| 3,835,712 | 9/1974 | Muller | 73/462 |

Primary Examiner—James J. Gill

[57] ABSTRACT

A system and method for analyzing the amplitude and zero crossing portions of a signal derived from piezoelectric cells of a type used in monitoring rotary wheel/tire movements. Comparing circuits receive either an amplitude or timing signal derived from the monitored wheel. Lights coupled to the comparators change state in response to adjustments manually made to a second input in each of the comparators. The degree of adjustment serves as a measure of amplitude or angular location so as to determine the angular locus and amount of weight to be employed.

3 Claims, 8 Drawing Figures

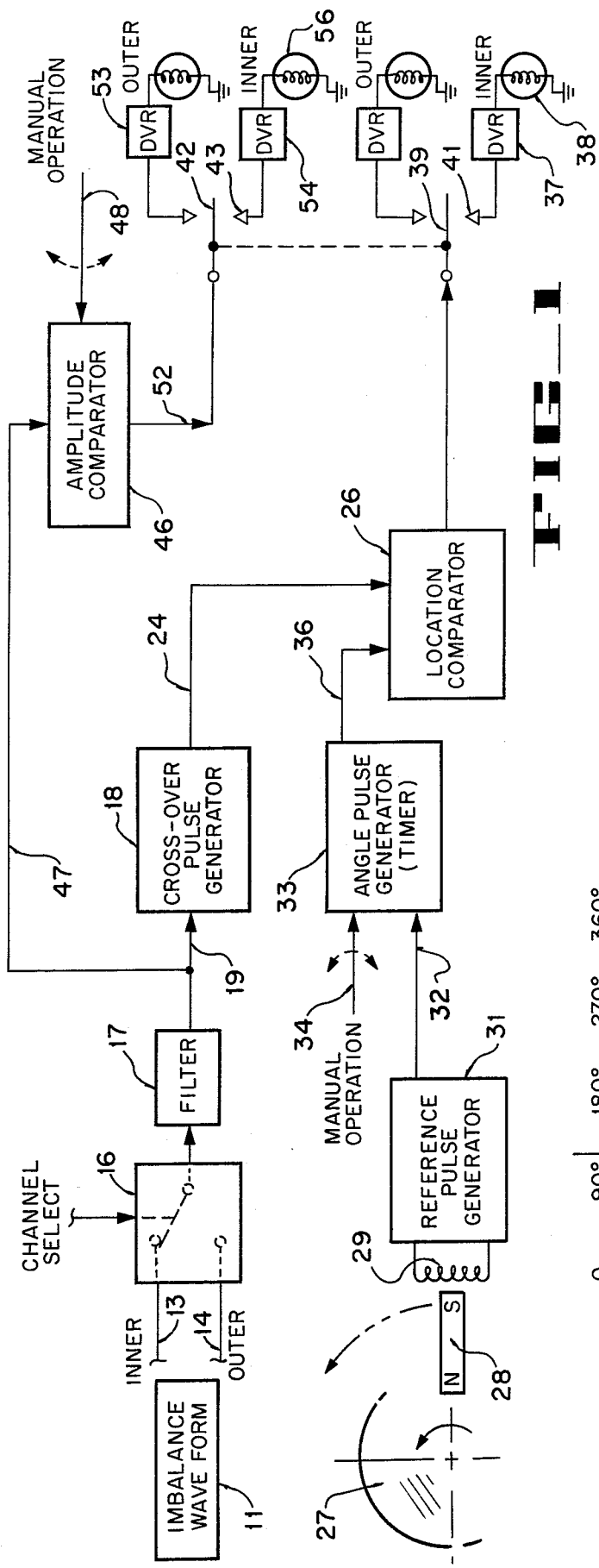
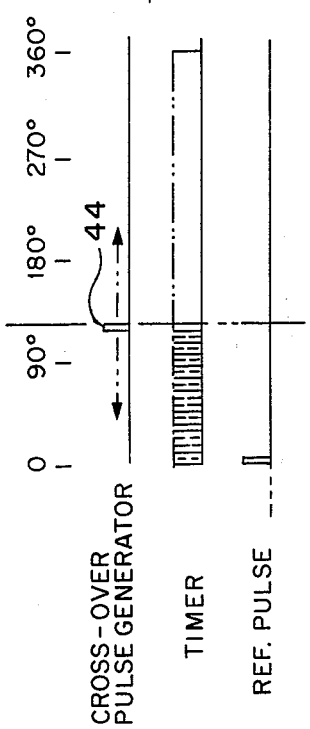
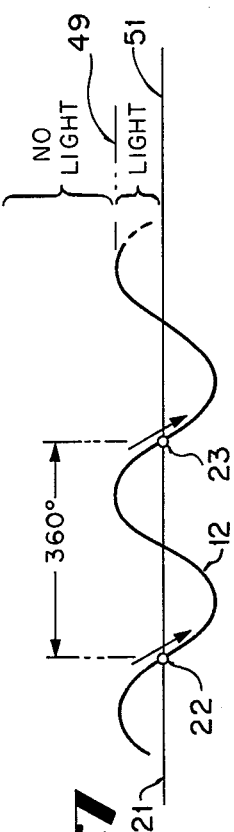
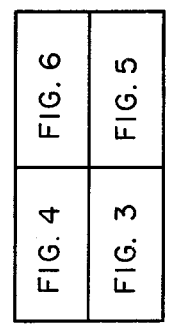

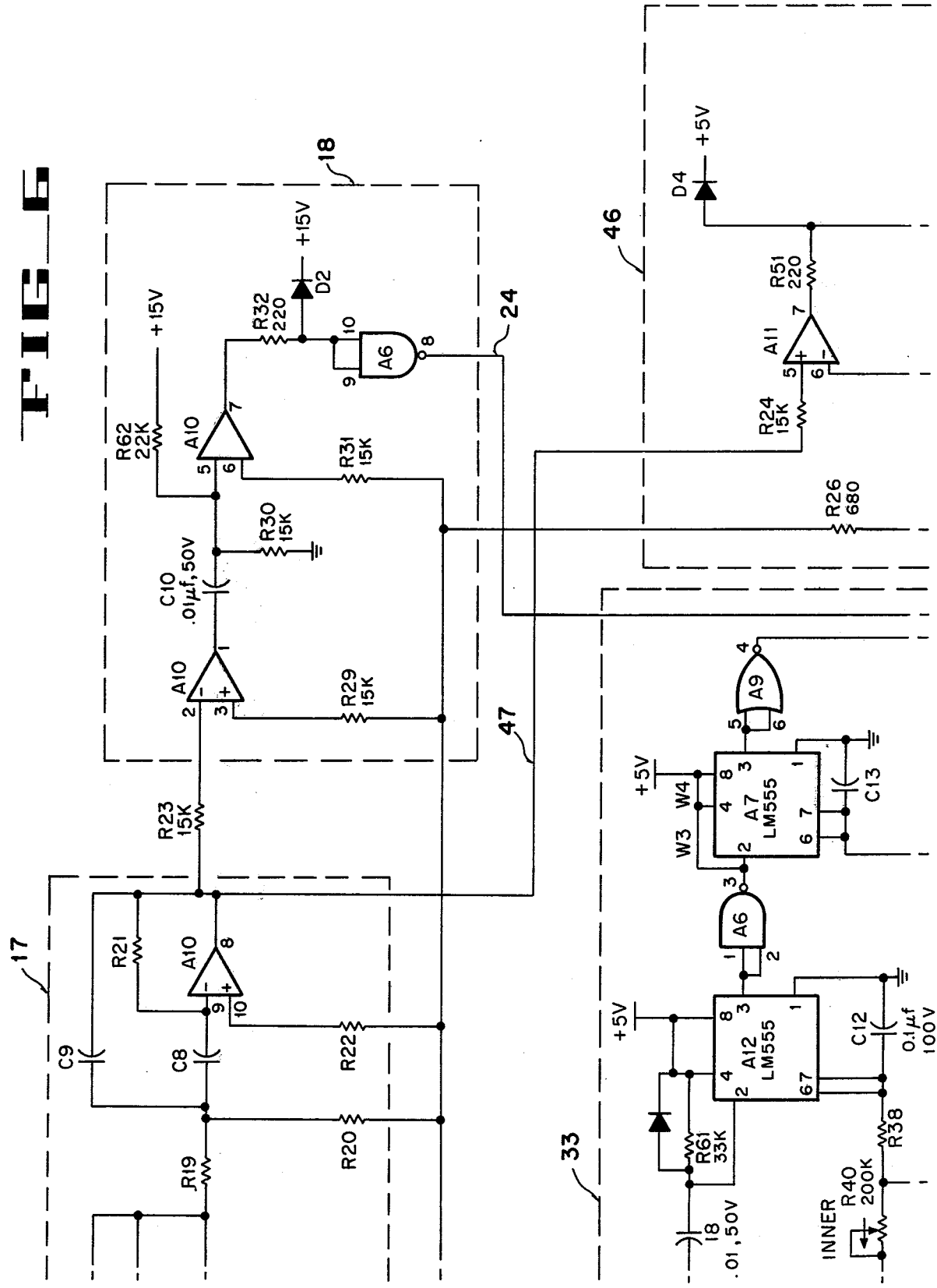

SYSTEM AND METHOD FOR IDENTIFYING ANGULAR LOCATION AND AMOUNT OF WHEEL BALANCING WEIGHTS

BACKGROUND OF THE INVENTION

This invention pertains to electronic means and a method for determining the quantity and location of weights required for counterbalancing a rotating member.

In determining the amount of weight to be added to a rotating body in order to counterbalance the body, systems have previously been devised for detecting the peaks of waveforms and storing the value of the peaks so detected for display on meters or on light emitting character displays.

As respects the problem of determining the appropriate location for the weight, systems have previously detected a reference pulse train associated with the rotational position of the balance mechanism shaft and also detected a second pulse train. The technique was to count the number of pulses of the second pulse train between the time of cross-over of the waveform to a pulse of the first pulse train. This number than represented the rotational location of the required counterbalance weight. The number was then stored and displayed on meters or character displays.

With respect to amplitude, the present invention detects only whether or not the amplitude of the waveform exceeds a certain value. If it does, then a light flashes in response to detection of this waveform. If it does not, the light does not flash. The particular value is adjustable by the operator over a calibrated range. The adjustment is representative of the amount of counterbalance weight required.

Advantages of this approach are that no peak detection circuitry is needed and no storage is required. Additionally, an inexpensive light is used as a display instead of a meter or a light emitting character display.

With respect to the location detection portion of the system, the present invention detects only a single pulse train for a reference. The time between pulses is well established since the shaft is driven by a motor connected to the power mains. A timer is used to generate an angle pulse whose duration is varied by the operator from 1/50th to 49/50ths of the period of the shaft rotation. Further, the time of cross-over of the waveform is detected and a cross-over pulse generated at that time. If the cross-over pulse occurs at any point during the existence of the angle pulse, the circuits are arranged whereby a light will be activated. Otherwise, the light does not turn on. The location of the required counterbalance weight is determined by the operator varying the angle pulse duration until a light is just on the verge of flashing.

Advantages of the foregoing arrangement relative to detection of the angular locus of the weights to be secured to a wheel/tire combination are to be found in the fact that only one pulse train is required and no storage is necessary. Further, the display constitutes an inexpensive light instead of a meter or character display.

SUMMARY OF THE INVENTION AND OBJECTS

A system for detecting the angular locus for and amount of weights to be secured to a wheel and tire combination for balancing the combination includes means for electronically monitoring unbalanced forces on the rotating combination to generate a waveform representative of the unbalanced movements thereof in which the amplitude of the waveform has a predetermined relation to the amount of weight required for balancing and wherein the wave crosses the zero amplitude axis in a predetermined direction during its period at an angular position defining the locus where the weight should be added to the combination. A crossover pulse generator generates a pulse as the waveform crosses the zero amplitude axis in a predetermined direction and this pulse cooperates with a reference pulse generated for each revolution as they are both used in a comparator. There is then provided means for displacing one of the pulses to occur conjointly with the other and light means responsive to the conjoint occurrence of the two pulses entering the comparator. The amount of displacement required serves as a measure of the angular locus of the position where the weights should be secured to the wheel. For determining the amount of the weight, an amplitude comparator is employed together with means supplying a signal to the comparator representative of the amplitude of the waveform. An amplitude reference signal is also supplied to the comparator. Means for displacing one of the signals to an amplitude greater and less than that of the first named signal and light means responsive to displacements of the amplitude of the one signal across the level of the amplitude of the other signal serve to operate the light means from one condition to another.

According to the preferred embodiments shown herein, an improved method has also been disclosed as noted below.

In general, it is an object of the present invention to provide an improved electronic means for detecting the angular locus and amount of weight to be added to a wheel and tire combination for counter-balancing the wheel and tire combination.

It is another object of the present invention to provide a system of the foregoing type in which relatively simple controls are employed.

It is an additional object of the present invention to provide a system of the kind described utilizing a limited number of components and an inexpensive display.

The foregoing and other objects of the present invention will be more readily understood from the following detailed description of preferred embodiments when considered in conjunction with the drawings.

BRIEF DESCRIPTION OF THE DRAWINGS

FIG. 1 shows a diagrammatic system arrangement according to the invention.

FIG. 2 shows the arrangement of FIGS. 3–6 for assembly.

FIGS. 3–6 show quadrants of an overall system diagram according to the invention.

FIG. 7 shows a diagrammatic explanatory view of a waveform.

FIG. 8 shows a timing diagram disclosing the sequence of operations from different portions of the equipment.

DETAILED DESCRIPTION OF PREFERRED EMBODIMENTS

Figure 3:
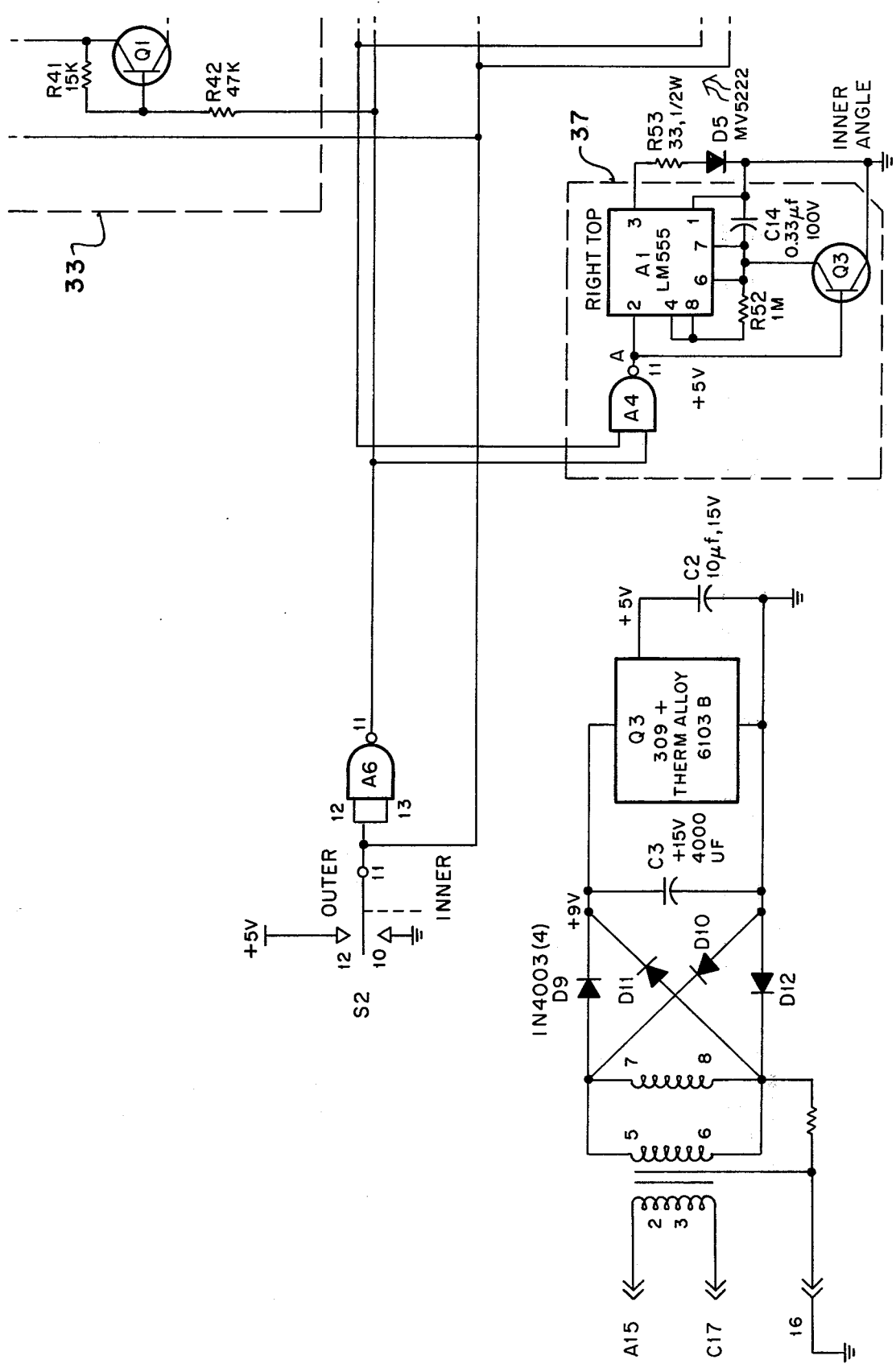

As shown in the diagrammatic system of FIG. 1, the box 11 schematically represents known means for electronically monitoring unbalanced forces on the combination of a tire and wheel so as to generate a waveform representative of the forces thereon in which the amplitude of the waveform has a predetermined relation to the amount of weight required for balancing and further wherein the wave crosses the zero axis in a predetermined direction during its period at an angular position defining the locus where the weight should be added to the wheel.

Such a waveform has been shown in FIG. 7 for purposes of illustration.

In accordance with known techniques, the signal of waveform 12 is derived from piezoelectric cells.

Separate waveforms 12 can be applied to the inner and outer sides of the wheel/tire combination and these will separately appear on the leads 13, 14 where one or the other can be selectively switched into the system for evaluation.

Thus, according to the system in FIG. 1, a channel select mechanism represented by the box 16 is arranged for coupling either the waveform appearing on lead 13 or is to be switched to couple the waveform on lead 14 to be fed through the system.

Assuming the connection made is the one shown, the waveform is immediately transmitted through a filter 17 and then to a cross-over pulse generator 18 via lead 19.

Cross-over pulse generator 18 is a device of a type for detecting and generating a pulse in response to the passage of the signal along trace 12 in a predetermined direction and moving across the zero amplitude axis 21. In the present instance the negative going slopes of trace 12 as appearing, for example, at points 22, 23 serve to activate pulse generator 18 to provide an output pulse on lead 24 supplied to a location comparator 26.

The mounting shaft 27 for supporting the wheel and tire combination includes a magnet 28 which passes once per revolution in proximate relation to a pick-up coil 29 to activate a reference pulse generator 31 of suitable construction whereby a reference pulse will occur on lead 32.

The pulse appearing on line 32 activates a timer circuit 33 which functions as an angle pulse generator to provide an output on lead 36 which can be varied by the operator from 1/50th to 49/50ths of the period of the shaft rotation using a manually variable control 34.

Comparator 26 is constructed and arranged in a manner whereby conjoint occurrence of output signals on leads 24 and 36 serves to activate the comparator and provide a pulse to driver 37 of a suitable type which remains on while activating light means 38. (It is assumed at this point that switch armature 39 has been moved to the contact point 41 and that switch armature 42 has similarly been moved to contact point 43.)

From the foregoing it should be readily evident that if the cross-over pulse on lead 24 occurs at any point during the angle pulse on lead 36, light 38 will be activated. The location of the required counter-balance weight is determined by the operator varying the angle pulse duration until the light is just on the verge of being activated as shown, for example, in FIG. 8. FIG. 8 discloses a cross-over pulse 44 located approximately at 120° in the period of waveform 12. Timer 33 can be adjusted by the manual operation of control 34 to a point where the duration of the output on lead 36 commences with the starting pulse arriving on line 32 and remains on lead 36 for a period on the order shown. If timer 33 is adjusted by control 34 so that the duration is shorter, the light 38 will not be activated. On the other hand, if timer 33 is adjusted to a point where the time duration thereof extends considerably beyond 120°, then in that event the light 38 will flash continuously. Accordingly, in order to determine the position of the cross-over pulse 44, it is necessary to adjust timer 33 to a point where light 38 is on the verge of being activated.

Means have been provided for determining the amplitude of the waveform 12 so as to obtain a measure of the weight needed to be secured to a wheel at the locus previously defined.

In this regard, an amplitude comparator 46 receives a direct input via line 47 from lead 19 so as to supply a signal to the comparator 46 representative of the amplitude of the waveform. A second input signal is applied via the manually adjustable input 48 so as to provide an amplitude reference signal coupled to the comparator 46. Input 48 is movable manually so as to provide a voltage as shown in FIG. 7 which is either greater than or less than the amplitude level 49 of waveform 12. Accordingly, if the input 48 provides a voltage in the region 51, comparator 46 is arranged in a common manner whereby both the input from 48 and from lead 47 serve to provide an output on line 52 for activating one or the other of the two drivers 53, 54. In the present case where channel select element 16 is coupled to the inner waveform line, driver 54 will be activated so as to operate the light bulb 56.

In short, as disclosed herein, the arrangement of amplitude comparator 46 is such that it detects only whether or not the amplitude of the waveform exceeds a predetermined value established by input 48. If it does, the light 56 is activated. If it does not, the light is not activated. The predetermined value is, however, adjustable by the operator over a calibrated range.

The degree of adjustment is representative of the amount of counter-balancing weight which will be required.

Figure 4:
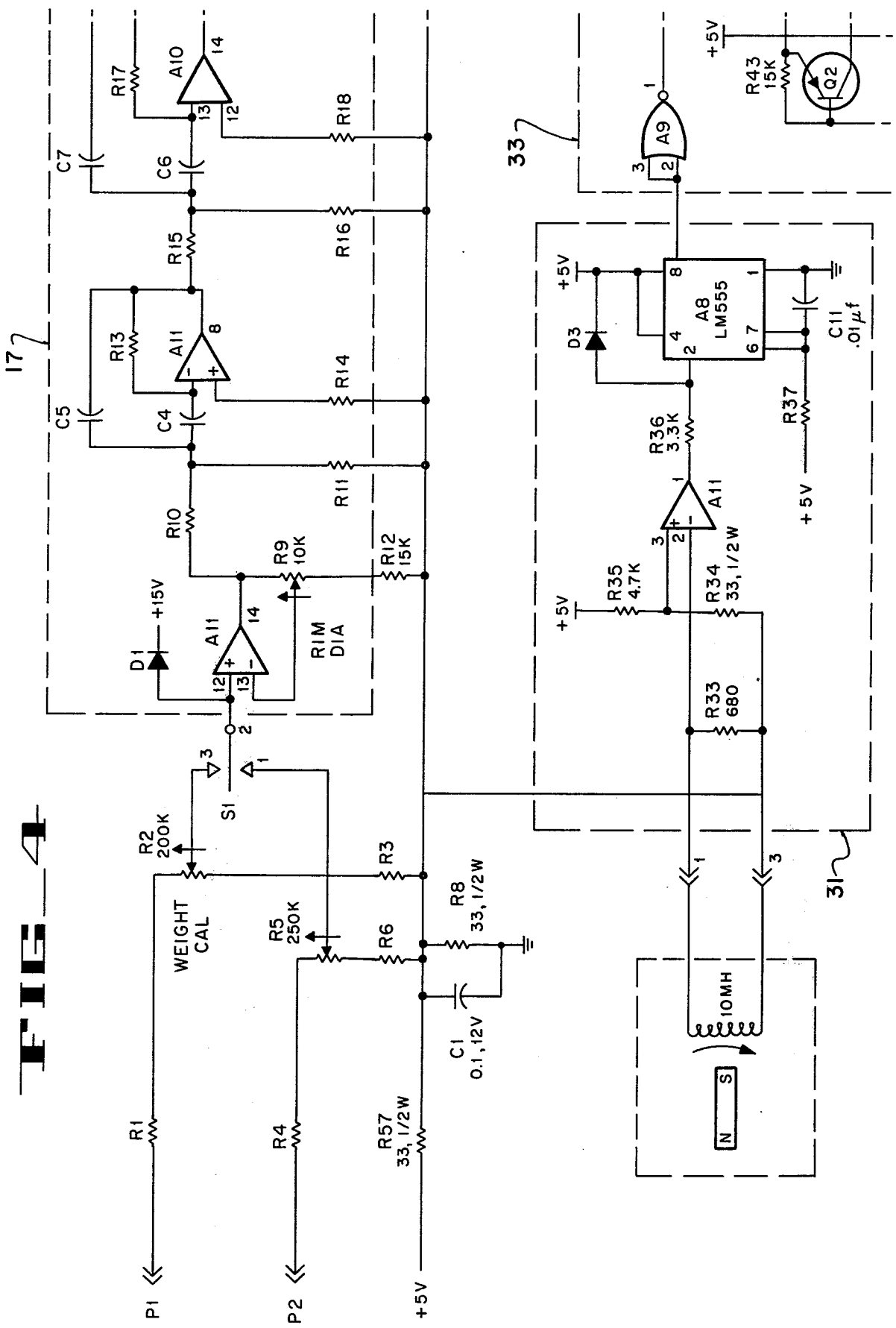
Figure 5:
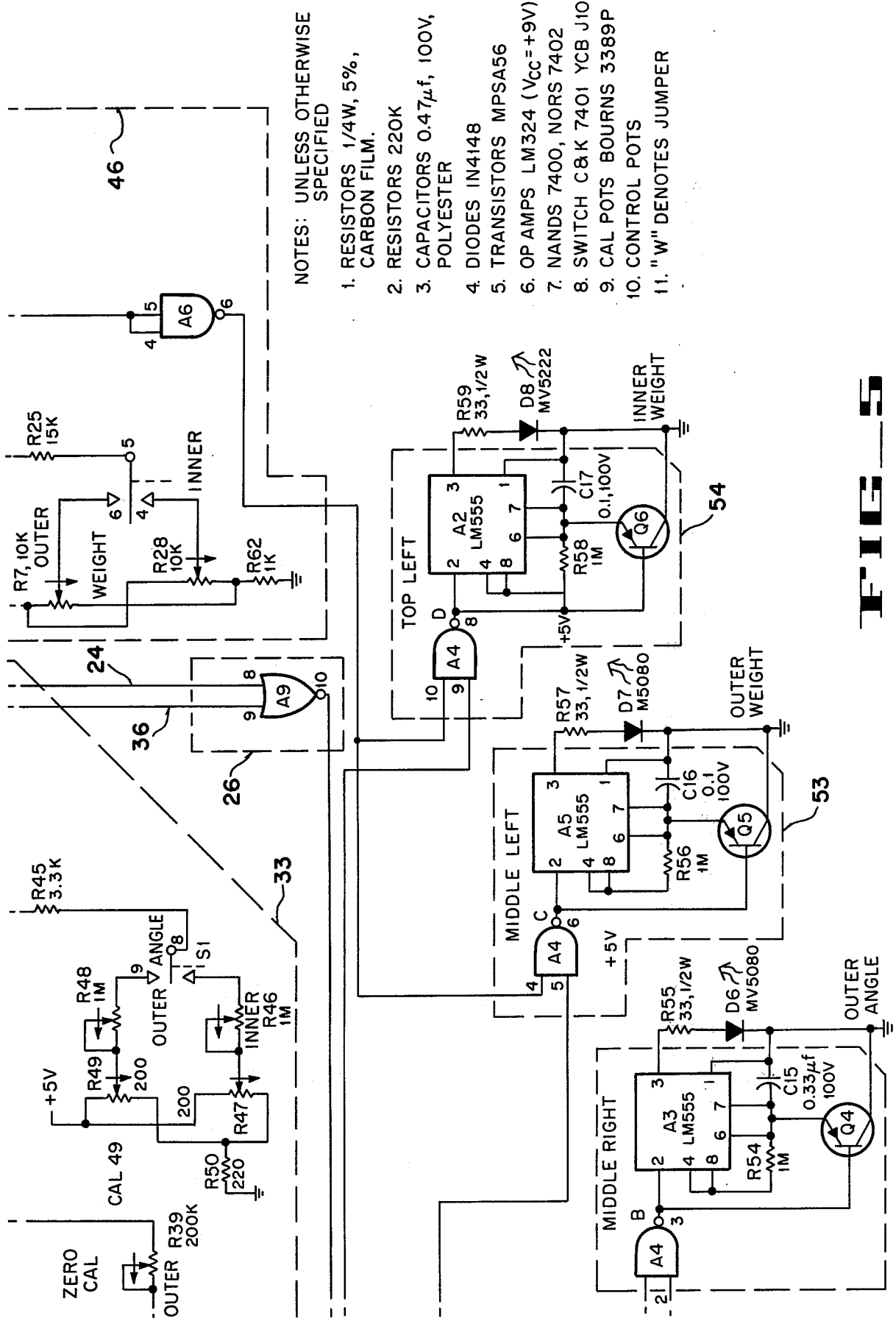

Further, as disclosed in FIG. 2 through FIG. 6, an operable system has been provided which carries out all of the functions noted above.

Accordingly, FIGS. 3, 4, 5 and 6 are to be disposed in the positions shown in FIG. 2 in order to provide a complete operating system of the type described above.

From the foregoing it should be readily evident that there has been provided an improved and relatively simple electronic means for determining the amount and location of weights to be applied to wheels associated with tires for balancing.

What is claimed is:

1. In a system for detecting the angular locus for weights to be secured to a rotatable body in balancing the body means for electronically monitoring unbalanced forces on the body to generate a periodic waveform thereof in which the wave crosses the zero amplitude axis in a negative going direction during the period thereof at an angular position wherein said weight should be added to the body, comprising means for generating a cross-over pulse in response to each negative going crossing of the zero axis, locus detecting means having two inputs, one of said inputs being operatively coupled to receive said cross-over pulses, means serving to sense each revolution of the body and to provide a reference pulse in response thereto, timer means responsive to said reference pulse for generating an angle pulse, said angle pulse forming said second input to said locus detecting means, lighting means coupled to said locus detecting means, said detecting means serving to detect when said signals are conjointly present on said two inputs and serving to operate said lighting means from a first to a second condition responsive to the conjoint presence of said first and second inputs, means for varying the duration of said angle pulse from a first pulse duration to a second pulse duration until said second condition is on the verge of being achieved, the degree of said varying of the last named said means serving to define the angular position for weight to be added.

2. In a system for detecting the angular locus for weight to be secured to a rotatable body for balancing the body using means for electronically monitoring unbalanced forces on said body to generate a waveform representative of the movements thereof in which the wave crosses the zero amplitude axis in a predetermined direction during its period at an angular position defining the locus where the weight should be added to the body, comprising a cross-over pulse generator for generating a pulse as the waveform crosses the zero amplitude axis in a predetermined direction, a reference pulse generator for generating an angular reference pulse for each revolution, means for displacing one of said pulses to occur conjointly with the other, and light means responsive to the conjoint occurrence of said pulses.

3. In the method of detecting the angular locus for weights to be secured to a wheel and tire combination for balancing the combination, the steps comprising monitoring a periodic waveform representative of the unbalanced forces on the combination in which the point where the waveform crosses zero amplitude axis while moving in a predetermined direction defines the angular locus on the wheel where the weight is to be secured, providing a pulse in response to each said cross-over in said waveform, providing a reference pulse for each revolution of said combination, detecting when said signals are present conjointly by displacing one of said pulses to occur conjointly with the other, operating a light in response to the conjoint occurrence of said pulses, determining the degree of displacement of said pulses to define the angular locus of said weight.

* * * * *